UNITED STATES PATENT OFFICE.

LEE O. WALLER, OF PHILADELPHIA, PENNSYLVANIA, ASSIGNOR TO KAL-PHENO CHEMICAL COMPANY, OF SMYRNA, DELAWARE, A CORPORATION OF DELAWARE.

DENTIFRICE.

1,107,389.  Specification of Letters Patent.  Patented Aug. 18, 1914.

No Drawing. Application filed February 18, 1913. Serial No. 749,108.

*To all whom it may concern:*

Be it known that I, LEE O. WALLER, a citizen of the United States, and a resident of the city of Philadelphia, in the county of Philadelphia, State of Pennsylvania, have invented certain new and useful Improvements in Dentifrices, of which the following is a specification.

The object of my invention is to provide a dentifrice which will effectively purify, clean and preserve the teeth, gums and other parts of the oral cavity, destroy or neutralize the acids in the secretions of the mouth, and permeate the fluids to the point of excretion; prevent fermentation caused by the concentration of acid in the mucous glands; destroy bacteria by inhibition; stimulate the tissues to normal activity; promote circulation where the tissues of the mouth have become callous or diseased; and promote metabolism by active reactions. Other objects of my invention will appear in the specifications and claims below.

More specifically my invention relates to the production of a composition of matter for use as a dentifrice or as a base for dentifrice, which, in addition to other suitable ingredients or materials hereinafter mentioned, contains a soluble salt, rich in or heavily charged with oxygen. When the said soluble salt comes into association with the acids contained in the mouth, the hydrogen of said acids unites with some of the oxygen of the said soluble salt, rich in oxygen, and forms water, and at the same time frees oxygen from the said salt while it is in intimate contact or relationship with the bacteria or fermentive material in the mouth and with the tissues and glands of the mouth. This action therefore results in the breaking up of the acid molecules of the said secretions and fluids of the mouth, neutralizing the same, and at the same time cleansing and purifying the oral cavity. This action is not, however, the mere freeing of oxygen in the oral cavity, for the liberation of free oxygen as a gas in the mouth would produce comparatively no chemical or physiological or germicidal effect. A free gas would not remain sufficiently long in contact with the tissues or secretions, or impurities of the mouth, to have any substantial effect upon them. The freeing of nascent oxygen, however, from a salt while that salt is in a dissolved condition, and while it is in immediate contact or association with all the tissues of the mouth and with the impurities or bacteria which may be in the mouth, causes the nascent oxygen to immediately unite with the acid secretions of the mouth and with the impurities, and to act directly upon the bacteria and tissues of the mouth, thus affecting physiological, chemical and bacteriological results.

The soluble salt which I prefer to use is phenolated clorate of potash. This substance may be obtained by passing the vapor of phenol into a warm tank or chamber within which or in communication with which is a cylinder containing chlorate of potash. The cylinder containing the chlorate of potash is rapidly revolved, to stir and agitate the contents thereof, and at the same time the vapor of phenol is forced into the cylinder where it unites or combines with the chlorate of potash. The chlorate of potash is thus treated with a vapor of phenol until it has absorbed about one-tenth of one per cent. (.1%).

Chlorate of potash ($KClO_3$), phenolated one-tenth of one per cent., and which is termed phenolated chlorate of potash, dissolves almost instantly, but the oxygen therein ($O_3$) is loosely attached to the base, and is readily freed or liberated or disassociated therefrom by the action of a weak acid. The acids contained in the mouth contain much hydrogen. When the phenolated chlorate of potash is introduced into the mouth it almost immediately dissolves in the fluids of the oral cavity and the water with which it is usually introduced into the mouth. But the said acid secretions and excretions contained in the mouth immediately begin to act upon the phenolated chlorate of potash, while the said phenolated chlorate of potash is in that dissolved condition, and in immediate contact with the entire interior of the oral cavity. The hydrogen of the acid unites with a part of the oxygen of the chlorate of potash forming water ($H_2O$). A portion of the oxygen is also freed from the chlorate of potash in a nascent state, and, being in intimate association with the impurities and bacteria, destroys them.

Another substantial ingredient of my improved dentifrice is a reaction product of menthol and thymol with formalin or formaldehyde, which may be and is preferably produced in a porcelain pulverizing machine by uniting crystal menthol (substantially 70%), formalin (substantially ½ of 1%) and thymol (substantially 29½%). The crystal menthol is first pulverized. To this is added the thymol containing one-tenth of one per cent. of its weight in alcohol. These two materials are pulverized by heavy pressure in a porcelain pulverizing machine until a semi-liquid mass is produced. The formalin is then added and the pulverizing action is continued at a temperature of about 90° Fahr. for from ten to fifteen minutes, or until the alcohol has evaporated. The material so formed is then subjected to a further pressure and the temperature is raised to substantially 120° Fahr. with the result that a semi-resinous mass is so formed. This material when ground into a fine powder is the reaction product of menthol and thymol with formalin or formaldehyde, forming an ingredient of my improved dentifrice. To what extent and in what manner these various ingredients treated as above set forth, unite or combine to form this reaction product of menthol and thymol with formalin or formaldehyde, I am at present unable to state. That there is some union or intimate association of them is certain, as shown from the character and properties of the resulting product, which product is a fine powder different in characteristics and properties from any of the ingredients singly considered. Nor is it a substance which is merely the sum of the various ingredients, because unless the various ingredients be combined in substantially the manner set forth, that is to say, by pulverization and by heating, the product will not be produced. Moreover, were chlorate of potash, which had not been treated with phenol in substantially the manner above set forth, to be substituted in making the composition, for phenolated chlorate of potash, the final product would not be obtained. Chlorate of potash, unphenolated, does not give up oxygen, when acted upon by weak acids of the oral cavity, to as great an extent, or with as much facility as phenolated chlorate of potash does.

I prefer to combine with the reaction product of menthol and thymol with formalin or formaldehyde various ingredients which have other and further antiseptic germicidal and stimulating properties. For this purpose I may add to the reaction product of menthol and thymol with formalin or formaldehyde, oil of eucalyptus, oil of myrtle, hydronaphthol and oil of wintergreen. Only a very small amount of each of these materials or ingredients is required in proportion to the amount of the reaction product of menthol and thymol with formalin or formaldehyde. Generally speaking, not over one-tenth of one per cent. of any of the said ingredients, so added to the reaction product of menthol and thymol with formalin or formaldehyde, is used, but even in these small amounts they are sufficient to produce marked beneficial effects when combined with the other ingredients of my improved dentifrice.

The reaction product of menthol and thymol with formalin or formaldehyde, to which has been added the oil of eucalyptus, oil of myrtle, hydronaphthol, and oil of wintergreen, as above described, may be combined by a pulverizing process with magnesium carbonate. I prefer to use about three parts by weight of the magnesium carbonate to one part of the reaction product of menthol and thymol with formalin or formaldehyde. The resulting composition may then be united with phenolated chlorate of potash produced, as above described, with calcium carbonate and with a small percentage of pure pulverized castile soap. Generally speaking, the proportions of the ingredients are so combined in substantialy the following proportions: Phenolated chlorate of potash twenty (20%) per cent., magnesium carbonate, combined with the reaction product of menthol and thymol with formalin or formaldehyde and other ingredients, (substantially 12%) and calcium carbonate (substantially 68%).

The materials thus combined constitute my improved dentifrice, or the base from which the dentifrice may be produced, for to produce a paste therefrom it is only necessary to add a sufficient amount of glycerin to keep the material in the proper pastelike condition. When a paste is to be produced a larger proportion of chlorate of potash with respect to the other ingredients is employed to advantage. This base may be suitably combined in any suitable manner with water or other fluids to form a mouth wash, an ointment, salve, lotion or semi-liquid.

It will be seen from the foregoing description that the chlorate of potash acts to break up the acid molecules of the oral cavity, and further, breaks up fermentation of organic matter. It also enters the ducts of the excretory glands of the oral cavity, ridding them of all acid accumulations, and stimulating them to the discharge of the secreted fluids.

It is to be understood that the proportions of the ingredients above given may be slightly modified, although I find that the proportions above stated produce very beneficial results. Also other well known ingredients for dentifrices, such as flavoring matter, coloring matter, etc., may be added without departing from the spirit and scope of my invention.

What I claim and desire to protect by Letters Patent of the United States is:

1. A composition for a dentifrice containing phenolated chlorate of potash and a reaction product of menthol and thymol with formaldehyde.

2. A composition for a dentifrice containing a soluble salt rich in oxygen, readily soluble in and readily decomposed by the weak acid solutions of the oral cavity, and a reaction product of menthol and thymol with formaldehyde.

3. A composition for a dentifrice containing phenolated chlorate of potash, a reaction product of menthol and thymol with formaldehyde and an abrasive.

4. A composition for a dentifrice containing phenolated chlorate of potash, a reaction product of menthol and thymol with formaldehyde, magnesium carbonate, germicidal and stimulating oils, soap and calcium carbonate.

5. A composition for a dentifrice containing phenolated chlorate of potash, a reaction product of menthol and thymol with formaldehyde, magnesium carbonate, germicidal and stimulating oils, soap, calcium carbonate and a vehicle.

6. A composition for a dentifrice containing phenolated chlorate of potash, a reaction product of menthol and thymol with formaldehyde, magnesium carbonate, germicidal and stimulating oils, soap, calcium carbonate and glycerin.

In witness whereof I have hereunto set my hand and seal this eighth day of February, 1913.

LEE O. WALLER.

Witnesses:
 LORNA D. TOBOLDT,
 MARGUERITE S. E. BROWN.